United States Patent
Ganapathy et al.

(10) Patent No.: US 9,264,515 B2
(45) Date of Patent: Feb. 16, 2016

(54) TECHNIQUES FOR MOBILE AUGMENTED REALITY APPLICATIONS

(75) Inventors: Subhashini Ganapathy, Portland, OR (US); Glen J. Anderson, Beaverton, OR (US); Delbert K. Marsh, Calabasas, CA (US)

(73) Assignee: Intel Corporation, Santa Clara, CA (US)

( * ) Notice: Subject to any disclaimer, the term of this patent is extended or adjusted under 35 U.S.C. 154(b) by 933 days.

(21) Appl. No.: 12/976,675

(22) Filed: Dec. 22, 2010

(65) Prior Publication Data

US 2012/0162255 A1    Jun. 28, 2012

(51) Int. Cl.
*G09G 5/00* (2006.01)
*H04L 29/06* (2006.01)
*A63F 13/30* (2014.01)
*G06T 19/00* (2011.01)

(52) U.S. Cl.
CPC ............ *H04L 67/38* (2013.01); *A63F 13/12* (2013.01); *G06T 19/006* (2013.01); *A63F 2300/204* (2013.01); *A63F 2300/307* (2013.01); *A63F 2300/406* (2013.01); *A63F 2300/5573* (2013.01); *A63F 2300/6676* (2013.01); *A63F 2300/69* (2013.01)

(58) Field of Classification Search
CPC . A63F 2300/69; G06F 3/005; G06K 9/00664; G06T 19/006
USPC .................................................. 345/632–633
See application file for complete search history.

(56) References Cited

U.S. PATENT DOCUMENTS

| | | | |
|---|---|---|---|
| 6,373,508 B1 * | 4/2002 | Moengen | 715/848 |
| 7,054,928 B2 * | 5/2006 | Segan et al. | 709/225 |
| 7,714,895 B2 | 5/2010 | Pretlove | |
| 7,796,155 B1 | 9/2010 | Neely, III | |
| 8,118,673 B2 * | 2/2012 | Coleman et al. | 463/31 |
| 8,414,390 B1 * | 4/2013 | Paleja et al. | 463/29 |
| 8,493,206 B2 * | 7/2013 | Richey et al. | 340/539.13 |
| 2009/0244097 A1 | 10/2009 | Estevez | |
| 2011/0102459 A1 * | 5/2011 | Hall | 345/633 |
| 2012/0092328 A1 * | 4/2012 | Flaks et al. | 345/419 |

OTHER PUBLICATIONS

Barakonyi et al., Agents That Talk and Hit Back: Animated Agents in Augmented Reality, Proceedings of the Third IEEE and ACM International Symposium on Mixed and Augmented Reality, 2004.*
Rösler, Augmented Reality Games on the iPhone—What are some of the possibilities and problems associated with the creation of augmented reality games for the iPhone, Bachelor Thesis, Blekinge Institute of Technology, Spring 2009.*
PCT International Search Report and Written Opinion issued in corresponding PCT/US2011/064471, dated Aug. 14, 2012 (9 pages).

* cited by examiner

*Primary Examiner* — Charles Tseng
(74) *Attorney, Agent, or Firm* — Trop, Pruner & Hu, P.C.

(57) ABSTRACT

Techniques are disclosed that involve mobile augmented reality (MAR) applications in which users (e.g., players) may experience augmented reality. Further, the actual geographical position of MAR application objects (e.g., players, characters, and other objects) may be tracked, represented, and manipulated. Accordingly, MAR objects may be tracked across multiple locations (e.g., multiple geographies and player environments). Moreover, MAR content may be manipulated and provided to the user based on a current context of the user.

29 Claims, 10 Drawing Sheets

| Object | MAR | Basis | Capability | Appear Rules | Status | |
|---|---|---|---|---|---|---|
| Bush | Bush | Real | Non-interactive | On detection | Act | ⋮ |
| Tree | Tower | Real | Non-interactive | On detection | Act | ⋮ |
| Car | Jeep | Real | Non-interactive | On detection | Act | ⋮ |
| Small truck | Jeep | Real | Non-interactive | On detection | Act | ⋮ |
| Large truck | Mobile Rocket | Real | Non-interactive | On detection | Act | ⋮ |
| Adult male | Soldier | Real | Non-interactive | On detection | Act | ⋮ |
| Adult female | Soldier | Real | Non-interactive | On detection | Act | ⋮ |
| Child | None | Out | | | | ⋮ |
| ⋮ | ⋮ | ⋮ | ⋮ | ⋮ | ⋮ | ⋮ |

FIG. 8

| ID | Class | Basis | Location | Capability | Appear Rules | Status | Strength |
|---|---|---|---|---|---|---|---|
| 0000001 | Player | Real | 45.519615, -122.865431 | Player | | Act | 80% |
| 0000002 | Player | Real | 45.519615, -122.865436 | Player | | Act | 20% |
| 0000003 | Monster | Virtual | 45.519615, -122.865451 | Attacker | 03182010 1500, 0000001 present | Act | 80% |
| 0000004 | Shield | Virtual | 45.519615, -122.865439 | Solid | | Act | 45% |
| 0000005 | Monster | Virtual | 45.519615, -122.865435 | Blocker | 03182010 1500, 0000001 present | Dormant | 100% |
| 0000006 | Gun | Real | 45.519615, -122.865436 | Basic | | Act | 100% |
| 0000007 | Gun | Virtual | 45.519615, -122.865439 | High | | Act | 100% |
| 0000008 | Wand | Real | 45.519615, -122.865434 | All | | Act | 4% |
| 0000009 | Shield | Real | 45.519615, -122.865436 | Attacker | | Act | 80% |
| 0000010 | Monster | Virtual | 45.519615, -122.865436 | Basic | 03182010 1500, 0000001 present | Dormant | 100% |
| 0000011 | Tank | Real | 45.519615, -122.865431 | Basic | Object recog. Match | Act | 80% |
| ... | ... | ... | ... | ... | ... | ... | ... |

FIG. 9

TECHNIQUES FOR MOBILE AUGMENTED REALITY APPLICATIONS

BACKGROUND

Mobile augmented reality (MAR) applications provide users with a view of an actual environment that is superimposed with virtual elements (referred to herein as "MAR objects"). Such MAR applications may include games, such as battlefield simulations.

During MAR application performance, users (e.g., players) may be mobile and view an augmented environment through their respective display devices. Moreover, users of such devices may interact with each other, as well as with objects provided by the MAR application. Such interactions may include aiming and shooting virtual ballistics at targets (e.g., virtual objects, and/or other players).

Currently, challenges exist in providing augmented reality to multiple users, and in the management of information associated with such augmented reality.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques in which the actual geographical position of MAR application objects (e.g., players, characters, and other objects) may be tracked, represented, and manipulated. For instance, MAR objects may be tracked across multiple locations (e.g., multiple geographies and player environments). Through this feature, a user may place virtual objects in positions relative to the other users. Also, the user may obtain mappings of objects within the MAR environment. As an example, such mappings may be relative to the user's device.

For example, a user not directly in the environment with other users may cause MAR objects to appear in the area where other users are located. Such objects may include attack characters, bombs, shields, etc. Further, this remote user's may view a display device that is updated based on MAR application activity occurring at this area.

Such features may advantageously enhance user interaction and provide a sense of natural reality. This is an improvement over existing MAR implementations, which are very basic and fail to provide rich interaction based on location information.

Further, embodiments provide for MAR content to be manipulated and provided to the user based on a current context of the user. This context may be based on various attributes, such as the location of the user. Moreover, embodiments may learn a user's usage pattern over time and customize the content that needs to be presented to the user. Such customization may be based on a user profile that is maintained. As a result, the user may be presented with better information.

For example, if a user is participating in a MAR application (e.g., a game) that allows MAR characters to appear on screen, embodiments may obtain situation-related information regarding the user. Such situation-related information may include (but is not limited to) the user's current location (e.g. the user is at home, in the café, at school, at an airport, etc.). Based on such information, the MAR application provides the user with a customized output.

This customized output may include particular view or visualizations on a display device. As an example, if the user is at home, then more comprehensive information may be provided (e.g., information regarding other players, MAR objects such as attack characters, bombs on shown on a map, etc.) However, if the user is at a less private or mobile context, less information may be provided. For instance, the user in this context may be presented with few character information details, and/or an abridged representation of MAR objects having few characteristics.

In embodiments, these customization techniques may employ artificial intelligence (e.g., heuristics) to not only process MAR objects but also allow the system to perceive the context and act in a way that is tailored to the user, a current context, and/or task(s) being performed. Thus, the presentation of MAR objects may be dynamically adjusted based on increased situational awareness of the user and the context.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Figure 1:
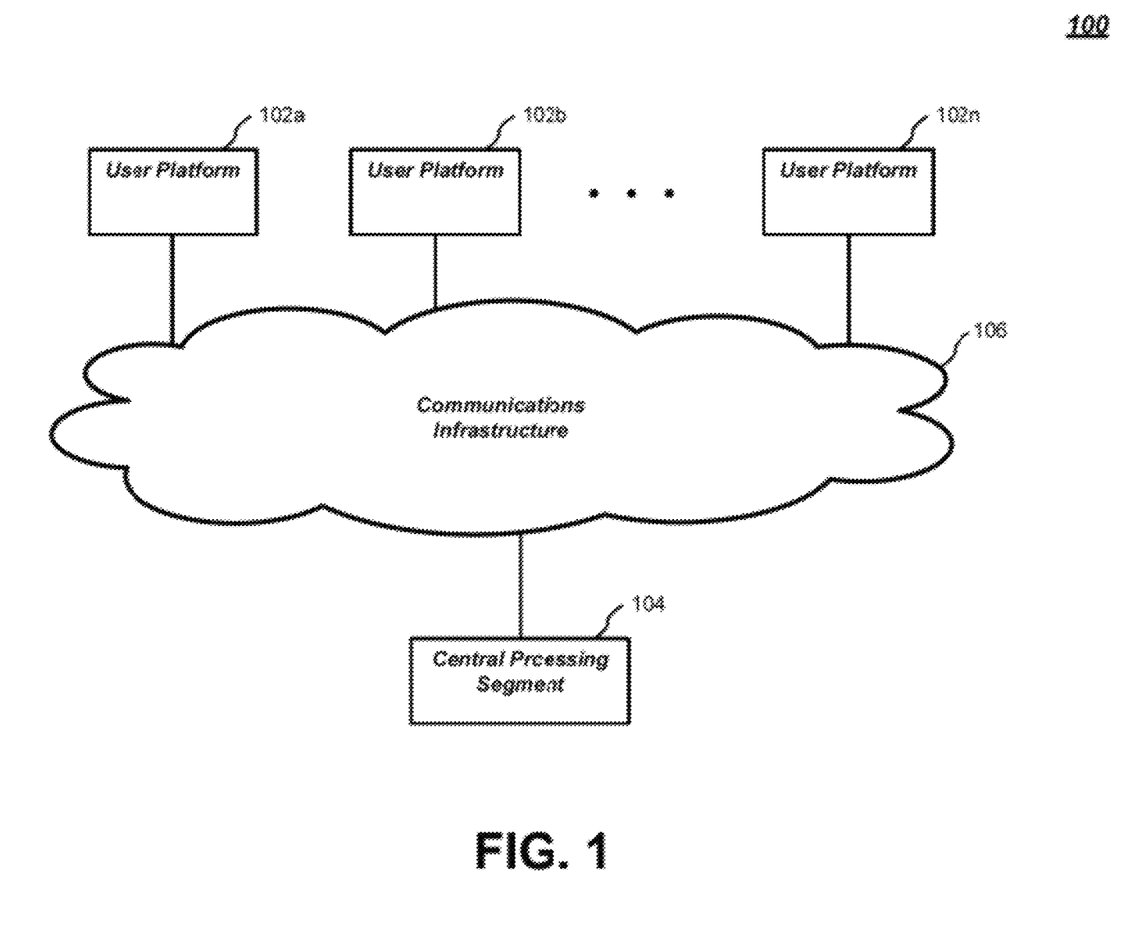
FIG. 1 is a diagram of an exemplary operational environment.

FIG. 1 is a diagram of an exemplary environment 100 in which the techniques described herein may be employed. This environment includes a plurality of user platforms 102*a-n*, a central processing segment 104, and a communications infrastructure 106. These elements may be implemented in any combination of hardware and/or software.

Together, the elements of FIG. 1 may perform operations associated with a MAR application. A battlefield gaming simulation is an example of a MAR application. In such an application, a simulated battle environment may be based on a real environment that a user is viewing on a display. The user may then virtually shoot at virtual targets on the screen. Moreover, such applications may show characters superimposed over that environment. In turn, the user may interact with these characters.

A shopping application is a further MAR application example. In such an application, a user may view a shopping mall live on a display device (e.g., on a handheld screen). Through the employment of MAR techniques, information regarding various stores in the shopping mall may be superimposed on the display. For example, such information may include names of the stores and/or details regarding sales going on at particular stores.

Each of user platforms 102a-n is associated with a particular user or participant in the MAR application. Also, each of user platforms 102a-n may be portable and travel with its user. Through these user platforms, a user may perceive (e.g., see and/or hear) an augmented reality.

For instance, each of user platforms 102a-n may include a display device that can display views of the augmented reality, as generated by the MAR application. This augmented reality may be based on a user's current perspective (e.g., the user's current location and orientation) within a real environment. More particularly, the user may view, from his/her current perspective, a real environment that is altered. Such alterations may include any combination of changes to the appearances of real objects, the removal of real objects from view, the addition of virtual (non-real) objects, as well as the display of information. For example, users may be augmented to appear as corresponding avatars. Such avatar-based augmentations may include overlaying different features (e.g., clothing, uniforms, body features, etc.) on image(s) of a user.

Further, each of user platforms 102a-n may include audio input and output devices. Through such devices, a user may receive audio that augments the real environment. The MAR application may attribute such audio to altered real object(s), virtual object(s), and/or other users (and/or their character objects). Further, a user may send audio to be outputted at a different user platform. Also, through such devices, users may engage in audio (e.g., voice communications with each other) with the ability to engage in audio communications with each other. Such communications may be across logical channels or "bands". Characteristics of these bands (e.g., their efficacy) may be affected by events of the MAR application.

Each of user platforms 102a-n may also include one or more input devices that allow its user to interact with a MAR application. Exemplary input devices include (but are not limited to) keypads, keyboards, and touch screens (e.g., implemented through user output device 206), handheld remote controls, gesture-based control devices, and/or voice-activated control devices that may employ speech recognition techniques.

The augmented reality described herein may be based on various factors. For instance, the augmented reality provided to a user of one of user platforms 102a-n may be based on the user's own actions, on the actions of another user (e.g., another player), and/or on operations automatically initiated by the MAR application.

Central processing segment 104 may provide information and operations that are employed by each of user platforms 102a-n. For example, central processing segment 104 may maintain information or data that is distributed to each of user platforms 102a-n. However, in embodiments, such information may be maintained by each of user platforms 102a-n in a distributed manner. Accordingly, information updates may cause communications so that user platforms 102a-n have current information. In such cases, central processing segment 104 may operate as an intermediary for the exchange of information between user platforms 102a-n. Moreover, central processing segment 104 may perform various application operations. Such operations may involve characteristics and interactions between MAR objects.

Communications infrastructure 106 provides for the exchange of information among user platforms 102a-n and central processing segment 104. In embodiments, communications infrastructure 106 may include one or more communications networks. These networks may be any combination of wired and/or wireless network(s). For example, communications infrastructure 106 may include any combination of wireless data networks, cellular networks, satellite networks, direct video broadcasting networks, wired telephony networks, cable television networks, the Internet, and so forth.

As described herein, users of user platforms 102a-n may perceive a real environment that is augmented in accordance with the MAR application. This augmenting may involve various features, as described herein. For example, the MAR application may insert objects into the viewpoints of users. Such objects may include (but are not limited to) characters.

Moreover, user platforms 102a-n may obtain information regarding the actual geographical position of MAR application objects (e.g., players, characters, and other objects). Through this information, features involving the tracking, representation, and/or manipulation of objects may be provided.

For instance, in situations where users are remote from one-another, embodiments may provide for a user to view maps that show other player locations along with the locations of MAR objects and characters that are in the remote player's vicinity. Also, a user may view a representation of a MAR area of activity (e.g., a field of play). This representation may be based on location information and player/character/object interactions. As a result, the user may advantageously view localized action of events as they occur.

Further, embodiments may provide for MAR objects and MAR characters to virtually travel across geographical areas, while users may track them in three dimensional space (e.g., globally and beyond). Also, when in a particular user's vicinity, the MAR character or MAR object may appear on that user's MAR display. Additionally, users may interact with MAR objects and MAR characters that are not in their visual vicinity by sending messages, attacks, etc.

Moreover, embodiments may employ MAR shield objects that can be "anchored" independently of individual user actions. MAR shield objects can have characteristics that absorb attacks (e.g., from other users). Further, such objects may be permanent or can be damaged or removed by other players.

Figure 2A:
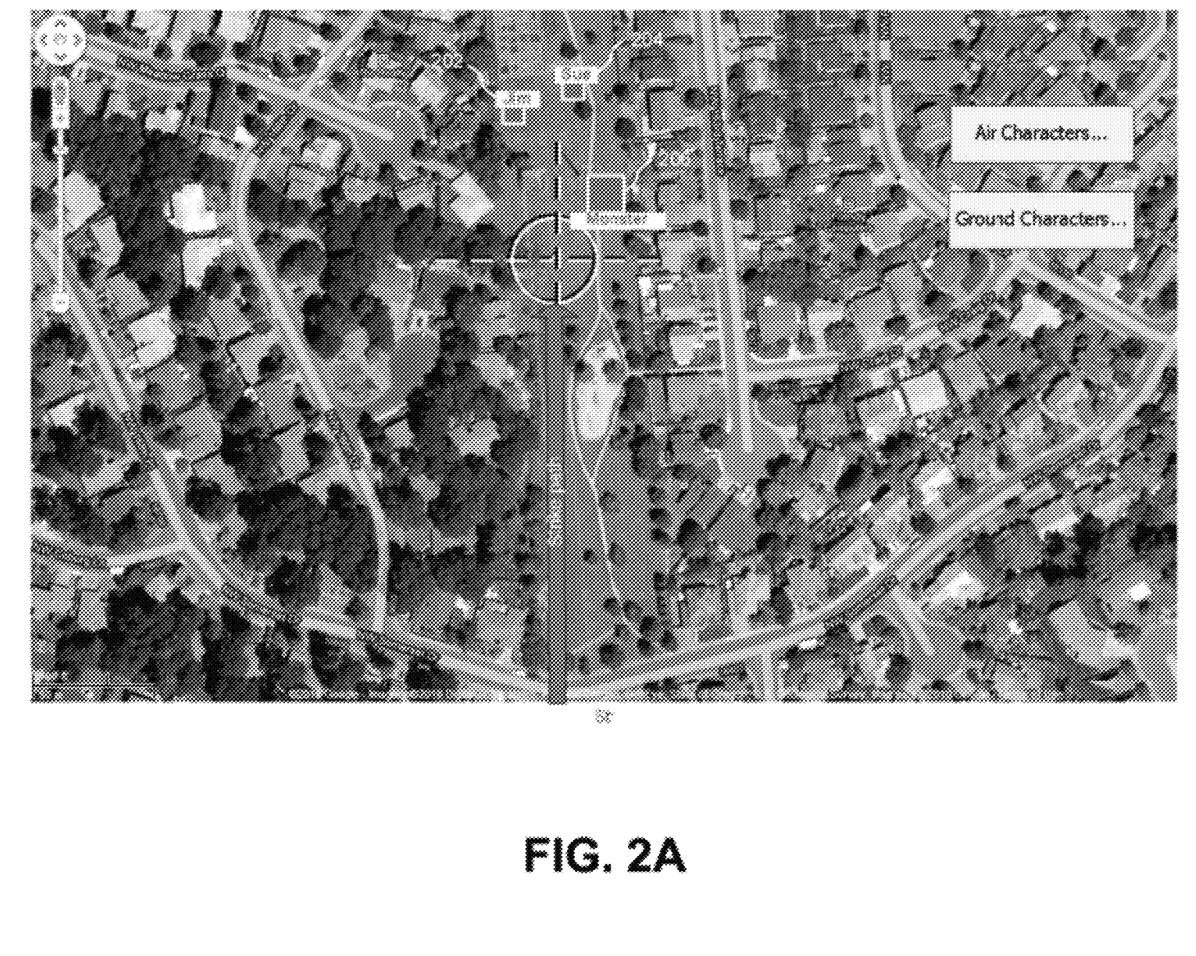
FIGS. 2A-2B are views of an exemplary scenario.
Figure 2B:
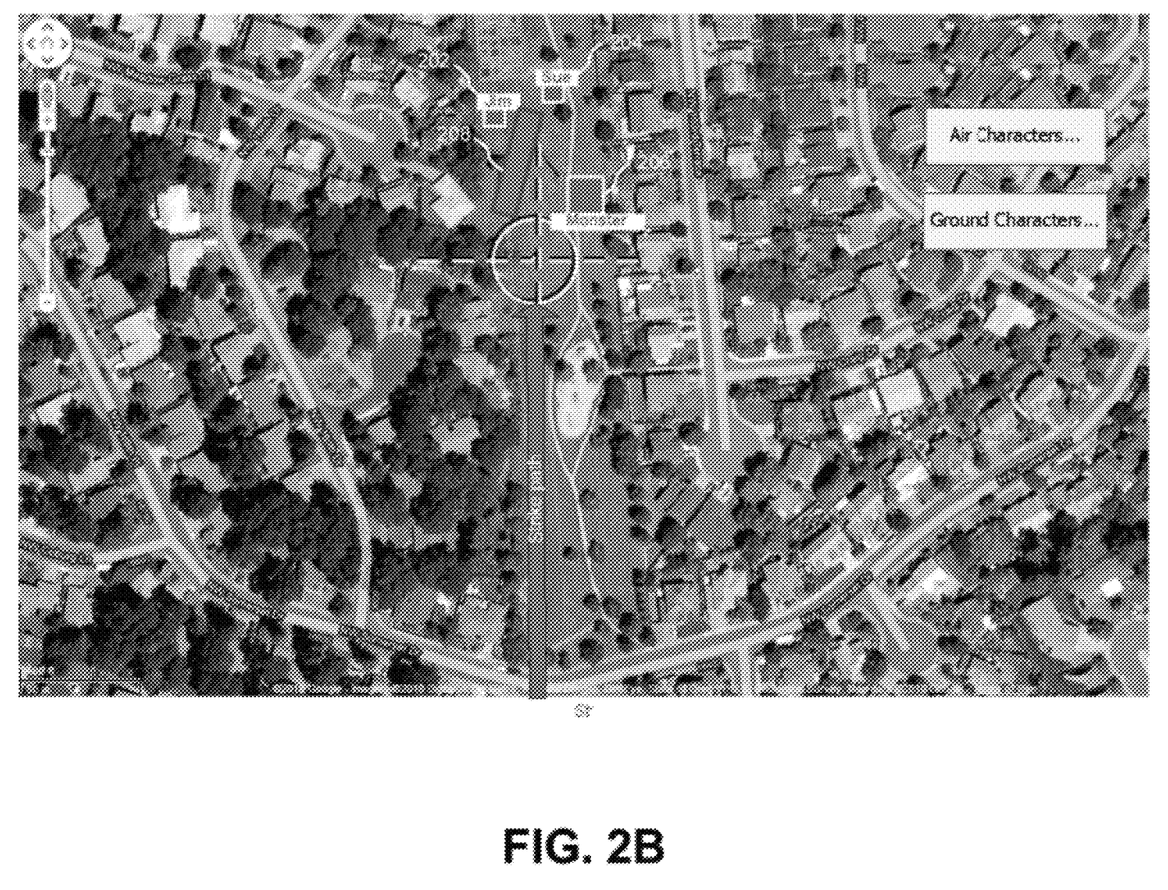

An exemplary scenario is now described involving a MAR gaming application. In this scenario, there are multiple users (players): Jim, Sue, and John. John is playing remotely from home, while Jim and Sue are outdoors in a playing field. Despite this, John may view characteristics of the playing field. For instance, FIGS. 2A and 2B provide exemplary aerial (or map) views of the playing field that may be displayed for John. In particular, these views show positions of Jim (202), Sue (204), and a monster character (206).

As shown in FIG. 2A, John can see that Jim is in a line of attack of the monster. Thus, John decides to send a virtual shield object to the playing field (shown in FIG. 2B as 208).

Further, John may notify Jim of the shield being sent. Additionally or alternatively, John may provide Jim with strategic advice. For example, John may direct Jim (e.g., through voice and/or text communications) to a hiding location (e.g., a bush near Jim's location) and ask him to hide from the monster. Thus, through such features, John can experience the game interaction with the virtual representation at home. In other words, even though John is remote from the playing field, he can nevertheless have the same level of experience that his friends are having outdoors through the augmented reality features described herein.

Jim or sue could also set virtual landmines by placing GPS-trackable objects that the monster virtually steps on and blows up. These would be physical objects in the real world that take on virtual capabilities.

Thus, users may, through display devices, view MAR versions of their current perspective of reality, as well as visualization and/or information that are not part of the current perspective (e.g., the aerial views of FIGS. 2A and 2B). Such visualizations may be provided to users concurrently or separately. Also, in embodiments, a MAR object may go from being a non-MAR representation on a display device (not in a user's visual field) to being a MAR representation. For example, a user may track a spaceship that appears just as a blip being tracked in a far area that is not in the user's field of view. Then, as the spaceship enters the user's field of view, it may be displayed to the user as a MAR object appearing overhead.

Figure 3:
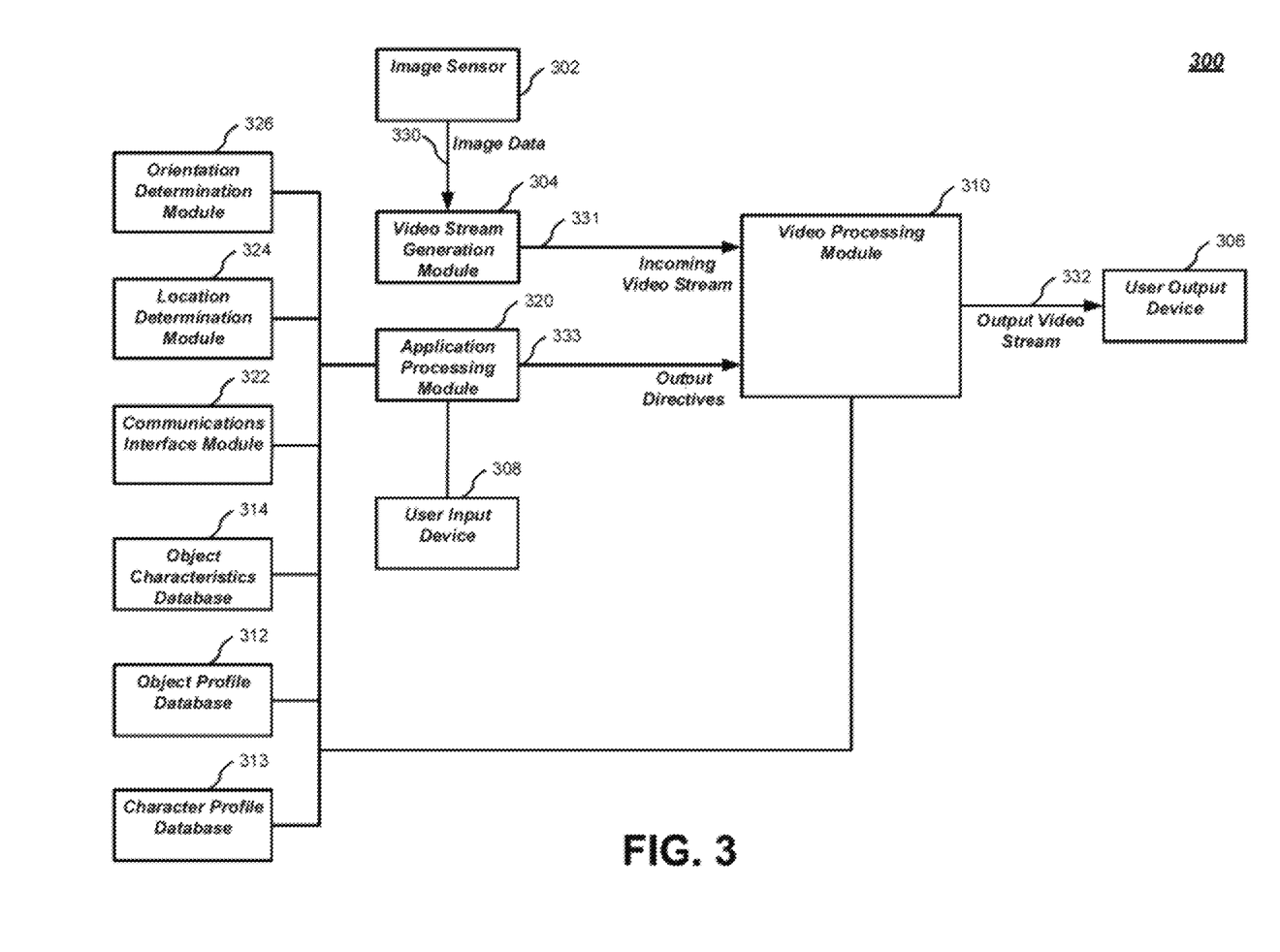
FIG. 3 is a diagram of an exemplary implementation that may be included in a user platform.

FIG. 3 is a diagram showing an exemplary implementation 300 that may be included in one or more of user platforms 102a-n. As shown in FIG. 3, implementation 300 may include an image sensor 302, a video stream generation module 304, a user output device 306, a user input device 308, a video processing module 310, an object profile database 312, a character profile database 313, and an object characteristics database 314. Also, implementation 300 may include an application processing module 320, a communications interface module 322, a location determination module 324, and an orientation determination module 326. The elements of FIG. 3 may be implemented in any combination of hardware and/or software.

Image sensor 302 captures images of a real environment. In turn, these images are passed to video stream generation module 304 as image data 330. Image data 330 may comprise intensity values (e.g., in color or monochrome) for a plurality of pixels. This data may be represented in various analog and/or digital formats.

In embodiments, image sensor 302 may be attached to the corresponding user. For example, it may be head-mounted or affixed to the user's apparel. Alternatively, image sensor 302 may be handheld. Embodiments, however, are not limited to these examples.

Video stream generation module 304 generates an incoming video stream 331 based on image data 330. In embodiments, this may involve performing various operations, including (but not limited to) analog-to-digital conversion, encoding, and/or compression.

FIG. 3 shows that incoming video stream 331 is sent to video processing module 310. In turn, video processing module 310 produces an output video stream 332. Output video stream 332 may convey alterations to objects identified within incoming video stream 331. Such alterations may be made to make real objects appear differently (e.g., to appear as MAR objects) in output video stream 332. In embodiments, output video stream 332 may include such alterations being overlaid on incoming video stream 331. Additionally or alternatively, output video stream 332 may include renderings of altered objects in isolation of incoming video stream 331.

The performance of such alterations may be based on video processing module 310 may recognize an object in incoming video stream 331. Based on this recognition, video processing module 310 may compare features of the recognized object with stored features for various object types. If a match occurs, then video processing module 310 may access a profile (e.g., from database 312 or database 313) corresponding to the object type. This profile may indicate whether alterations are to be made for the recognized object. In turn, video processing module 310 may generate alterations and include them in output video stream 322. Video processing module 310 may obtain characteristics of such alterations from object characteristics database 314.

Additionally or alternatively, output video stream 332 may include renderings and/or visualizations to be outputted on user output device 306. Such renderings and/or visualizations may be based on directives 333 that are received from application processing module 320. In embodiments, such renderings and/or visualizations may be overlaid onto incoming video stream 331 to produce output video stream 332. Alternatively, output video stream 332 may include such renderings and/or visualizations in isolation of incoming video stream 331.

As shown in FIG. 3, output video stream 332 is sent to user output device 306. User output device 306 may be of various device types that provide visual and/or audiovisual output. For example, user output device 306 may include a video display that renders an output video stream 332. Alternatively or additionally, user output device 306 may include a transparent projection surface. During operation, the user may view the real environment (as opposed to a video of the real environment) through this transparent surface.

Output video stream 332 may include alterations, renderings, and/or visualizations may be overlaid onto incoming video stream 331. However, output video stream 332 may include such renderings, and/or visualizations in isolation of incoming video stream 331.

In embodiments, user output device 306 may be attached to its user. For example, user output device 306 may be head-mounted or affixed to the user's apparel. Alternatively, user output device 306 may be handheld. Embodiments, however, are not limited to these examples.

User input device 308 allows the user to interact with a MAR application. Thus, through user input device 308, the user may participate in real-time with events of the MAR application. For example, in a tactical gaining application, the user may aim and shoot at various MAR objects. Also, user input device 308 provides for the user to generate profile information. Such information may involve created characters and/or associations between real objects and MAR objects.

In embodiments, such user interaction features may involve user input device 308 operating in coordination with a graphical user interface that is displayed by user output device 306. User input device 308 may be implemented with one or more devices. Exemplary devices include (but are not limited to) keypads, keyboards, and touch screens (e.g., implemented through user output device 306), handheld remote controls, gesture-based control devices, and/or voice-activated control devices that may employ speech recognition techniques.

Object profile database 312 includes information regarding various objects associated with a MAR application. Examples of such objects include persons, vehicles, landscape objects (e.g., trees, shrubs, rocks, sticks, etc.), buildings, and so forth. In embodiments, object profile database 312 may indicate whether alterations should be made for certain objects that are detected in incoming video stream 331. Details regarding an exemplary implementation of object profile database 312 are provided below with reference to FIG. 8.

Character profile database 313 includes information regarding characters that may be employed in a MAR application. In embodiments, characters include objects (e.g., beings and/or items) that are associated with and controlled by users (such as a user's avatar). Alternatively, characters may be objects (e.g., beings and/or items) automatically controlled by the MAR application. Details regarding an exemplary implementation of character profile database 313 are provided below with reference to FIG. 9.

Object characteristics database 314 includes information regarding the characteristics of various objects. For example, object characteristics database 314 may include features for one or more objects. Such feature data may be generated through image processing and/or object recognition techniques. Thus, such feature data may be used for identifying real objects that are detected in incoming video stream 331. The generation of feature data may be initiated by a user. Alternatively or additionally, such feature data may be received from a remote entity (e.g., central processing segment 104 of FIG. 1).

Application processing module 320 performs operations corresponding to the MAR application. For example, operations may involve actions of a player's character (e.g., target acquisition and shooting), as well as actions of other characters and objects. Such operations may be based on user inputs made through user input device 308. Based on such operations, application processing module 320 may generate output directives 333, which are sent to video processing module 310. Output directives 333 may specify particular renderings, visualizations, and/or features for output video stream 332. Based on these directives, video processing module 310 performs corresponding operations in the generation of output video stream 332.

Communications interface module 322 provides for implementation 300 to exchange information with one or more remote entities. In the context of FIG. 1, such remote entities may include one or more of user platforms 102*a-n* and/or central processing segment 104. Such information may include information regarding user interactions and/or MAR application operations. Such information may indicate updates to existing MAR objects, as well as data involving the creation of new MAR objects. As described herein, such information regarding MAR objects may be stored in databases 312-314.

Moreover, such information may include communications (e.g., voice and/or text communications) between users/players. For instance, groups of users/players may communicate across one or more communications bands. Such communications bands may be employed for various user/player groupings. Exemplary groupings include team members, all users/players, users/players having characters within proximity of each other, etc. In embodiments, such communications bands may be altered or stopped by virtual actions within the MAR application. For example, an attack by one team "breaks" the communication band of the other team. Additionally or alternatively, communication band(s) may be enhanced with audio representing virtually audible events (e.g., gun shots, explosions, etc.) from the MAR application.

Accordingly, communications interface module 322 may include control logic to operate in accordance with one or more communications protocols. Moreover, communications interface module 508 may include various elements, including (but not limited to) transceiver(s), modulators, demodulators, upconverters, downconverters, mixers, buffers, filters, and/or amplifiers.

Location determination module 324 determines a current location of implementation 300. Based on this determination, various operations may be performed. Such operations may be based on the locations of objects and/or characters provided by the MAR application. Further, this determined location may sent to remote devices (through communications interface module 322). In the context of FIG. 1, such devices may include one or more of user platforms 102*a-n* and/or central processing segment 104. Location determination module 324 may be implemented in various ways. For example, location determination module 324 may include a global positioning system (GPS) receiver.

Orientation determination module 326 determines a current positional orientation of implementation 300. More particularly, orientation determination module 326 may determine a viewing perspective of the corresponding user platform. Various techniques may be employed to provide such features. For instance, orientation determination module 326 may include components, such as accelerometer(s) and/or gyrometer(s).

Figure 4:
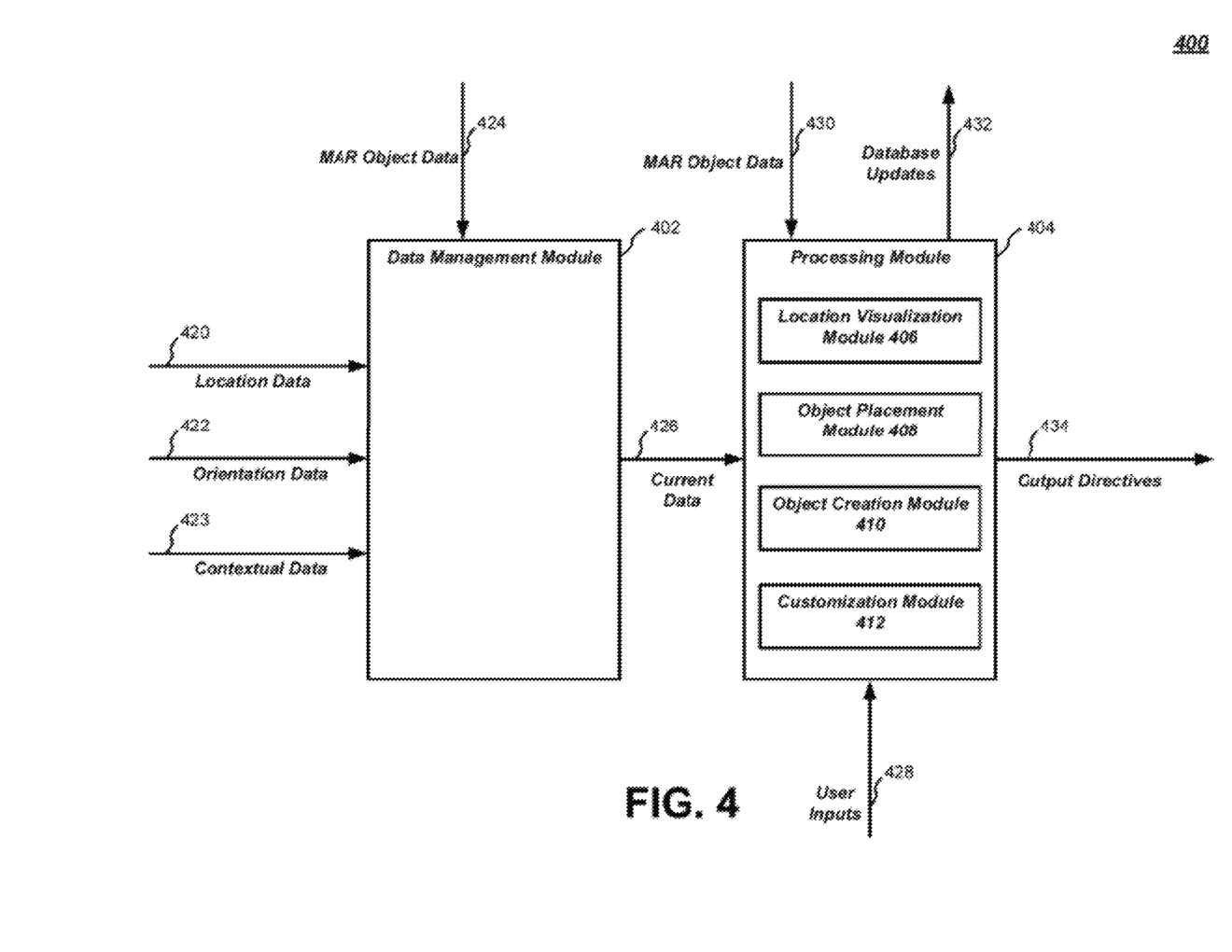
FIG. 4 is a diagram of an exemplary implementation that may be included in an application processing module.

As described above, application processing module 320 of FIG. 3 may perform various operations associated with a MAR application. FIG. 4 is a diagram of an exemplary implementation 400 that may be included in application processing module 320. As shown in FIG. 4, implementation 400 may include a data management module 402, and a processing module 404. These elements may be implemented in any combination of hardware and/or software.

Data management module 402 may receive various forms of input data. For example, FIG. 4 shows data management module 402 receiving location data 420 and orientation data 422. This received data provides a current position and orientation of the user's platform. In the context of FIG. 3, location data 420 and orientation data 422 may be received from location determination module 324 and orientation determination module 326, respectively. Embodiments, however, are not limited to this context.

In addition, FIG. 4 shows data management module 402 receiving contextual data 423. This data may include information regarding current operational characteristics. For example, contextual data 423 may indicate user device settings (e.g., applications being used, display device configurations, etc.) In embodiments, such information may be employed to customize the presentation of information to the user.

FIG. 4 shows that data management module 402 receives MAR object data 424. This data identifies and provides information regarding objects that are within a relevant proximity of the user's platform (e.g., within viewing range). In embodiments, MAR object data 424 is based on location data 420 and orientation data 422. In the context of FIG. 3, MAR object data 424 may be received from databases 312, 313, and/or 314 (e.g., in response to one or more location-based queries made by data management module 402). Thus, data 424 may include profile information for one or more objects.

As shown in FIG. 4, data management module 402 produces current data 426, which is sent to processing module 404. In embodiments, current data 426 may include some or all of the information provided by location data 420, orientation data 422, and MAR object data 424. Based on such information, processing module 404 may perform various operations.

FIG. 4 shows that processing module 404 includes a location visualization module 406, an object placement module 408, an object creation module 410, and a customization module 412. These modules may perform various operations based on user inputs 428. In the context of FIG. 3, such user inputs may be received from user input device 308.

In turn, processing module 404 may generate output directives 434. These directives may specify the rendering of particular user outputs (e.g., visual and/or audio outputs) to occur. In the context of FIG. 3, output directives 434 may be sent to video processing module 310 (e.g., as output directives 333), for the generation of output video stream 332.

Further, the performance of such operations may involve receiving MAR object data 430. Also, such operations may involve the creation of new MAR objects and/or the updating of existing MAR objects. According, FIG. 4 shows that processing module 404 may generate database updates 432. In the context of FIG. 3, MAR object data 430 may be received from databases 312, 313, and/or 314. Similarly, database updates 432 may be sent to databases 312, 313, and/or 314.

Location visualization module 406 provides for a user to visualize a particular location (e.g., through user output device 306). In embodiments, this location may be remote from the user's present location. For example, location visualization module 406 may provide for aerial or map views, as described above with reference to FIGS. 2A and 2B.

This remote location visualization may be based on object data 430. In this situation, object data 430 may provide information (e.g., profiles) of objects within the remote location. Further, this remote location visualization may be based on map images or aerial (e.g., satellite) images that processing module receives. Such images may be obtained locally or from a remote source (e.g. a web server).

Also, location visualization module 406 may provide for a user to visualize the user's current location. This visualization may be based on location data 420 and orientation data 422 (which may be used to determine a field of view). Further, this visualization may be based on object data 424, which identifies and provides information regarding objects that are within a relevant proximity of the user's platform. As described above, data 420, 422, and 424 may be provided to processing module 404 in current data 426.

Object placement module 408 provides for a user to place a MAR object (e.g., a character, a shield, etc.) at a particular location. For example, as described above with reference to FIGS. 2A and 2B, such placements may be performed in conjunction with a visualization of the location (e.g., a map or aerial view of the location). Based on this placement, information regarding the object may be updated through database updates 432.

Object creation module 410 provides for a user to create an object (e.g., a character or other object). Moreover, object creation module 410 provides for a user to modify an existing object. This may involve the user inputting various characteristics of an object. Information regarding such creation and/or modification may be generated and stored through database updates 432. Such creating and/or modifying may occur before and/or during MAR application sessions (e.g., games).

As described herein, embodiments may customize the presentation of MAR Information to a user based on the context in which the user is operating. Such customizations may be included in output directives 434. As shown in FIG. 4, customization module 412 may provide such customizations. For example, customization module 412 may employ rule(s) and/or taxonomy classification(s) to effectively couple contextual awareness, MAR objects and/or device status. As a result, output directives 434 may provide renderings and/or visualizations that are customized for the user. Moreover, such features may be based on a user profile that customization module 412 maintains.

Figure 5:
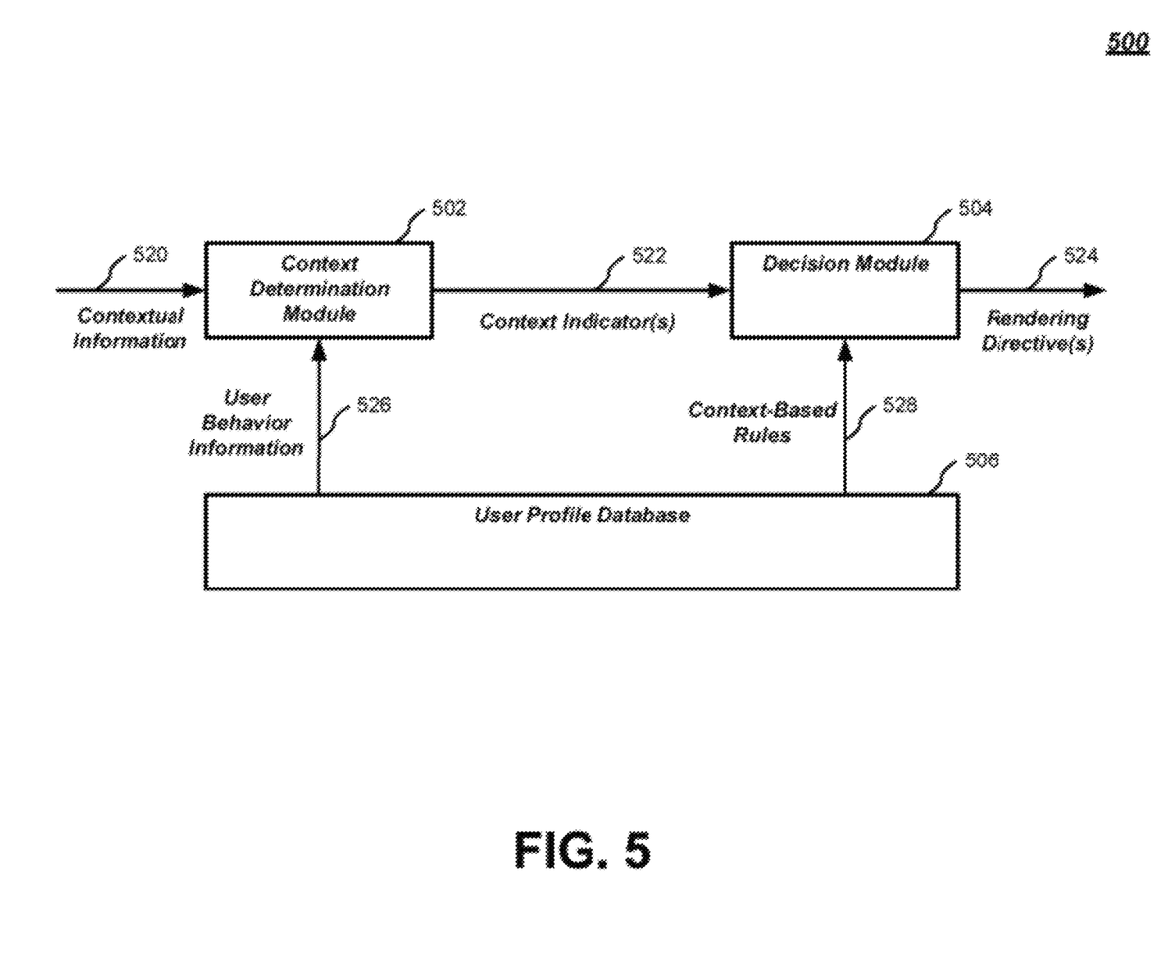
FIG. 5 is a diagram of an exemplary implementation that may be included in a customization module.

FIG. 5 is a diagram of an exemplary implementation 500 that may be included in customization module 412. As shown in FIG. 5, implementation 500 may include a context determination module 502, a decision module 504, and a user profile database 506. These elements may be implemented in any combination of hardware and/or software.

As shown in FIG. 5, context determination module 502 may receive current contextual information 520. Such information may indicate current circumstances, such as a user location, a user velocity (e.g., speed and/or direction of motion), descriptive information regarding the location (e.g., from a local source or a remote source), user device characteristics, etc. In the context of FIG. 3, such information may be included in current data 426 and/or user inputs 428.

Based on contextual information 520, context determination module 502 generates one or more context indicators 522. In embodiments, these indicators may identify current user activities (e.g., walking, watching television with friends, sitting, etc.), current device configurations (e.g., handheld device with notebook computer, handheld device with television, only handheld device, etc.), and/or current user location status (e.g., at home, in the park, at a coffee shop, etc.). These examples are provided for purposes of illustration and not limitation, thus embodiments may employ other forms of contextual information.

Tables 1-3, below, provide examples of such context indicators. In these tables, particular context indicators are used to specify location, activity, and device configuration.

TABLE 1

| Activity Code | Activity Name |
|---|---|
| A1 | Walking |
| A2 | Watching TV with friends |
| A3 | Sitting |

TABLE 2

| Device Code | Device Configuration |
|---|---|
| D1 | Handheld with Notebook |
| D2 | Handheld with Television |
| D3 | Handheld alone |

TABLE 3

| User Location Code | User Location Name |
|---|---|
| L1 | At home |
| L2 | In the park |
| L3 | At a coffee shop |

In embodiments, such contextual information may be determined automatically by context determination module 502 through various inferences and/or heuristics. For example, activities (e.g., walking, sitting, driving, etc.) may be inferred from location and/or velocity data. Further, such inferences may be informed through user behavior information 526 that is stored in user profile database 506. Also, such inferences may be made through responses to queries generated by context determination module 502.

Based on context indicator(s) 522, decision module 504 determines a customized presentation. In turn, decision module 504 may generate one or more rendering directives 524. In the context of FIG. 4, such directives may be included in output directives 434.

In embodiments, generation of this customized presentation may involve employing one or more context-based rules 528, which are received from user profile database. Table 2, below provides examples of such rules.

TABLE 2

| Action Code | Rule | Actions |
|---|---|---|
| 1 | IF activity = sitting AND IF device = handheld with notebook AND IF user location = at school | Show details (e.g., one or more of location, strength, health, score, etc.) of MAR objects on the device Create MAR environment on the device only when selected |
| 2 | IF activity = Watching TV with friends AND IF device = handheld with TV AND IF user location = at home | Show updates of MAR objects when user actively views the device Create MAR environment on television device |
| 3 | IF activity = sitting in a coffee shop AND IF device = handheld AND IF user location = coffee shop | Provide only selected updates |

In embodiments, user profile database 506 may store such rules. Also, user profile database 506 may store user behavior information. Such information may indicate contexts and corresponding information. As described above, context determination module 502 may employ such information in the generation of The features of FIGS. 3, 4, and 5 are described in the context of a user platform. However, it is worthy to note that these features may be allocated in various ways to one or more platforms. For example, maintained information (e.g., in databases 312-314) may be allocated among various device(s), such as a central device (e.g., central processing segment 104) and/or one or more user platforms. Accordingly, such information may be maintained, propagated, and/or distributed in various manners. Thus, in embodiments, each user platform may include data for all (or a relevant group of) MAR objects (e.g., in databases 312, 313, and 314). Likewise, one or more of the operational features described above with reference to FIGS. 3 and 4 may be allocated among various device(s), such as a central device and/or one or more user platforms.

Figure 6:
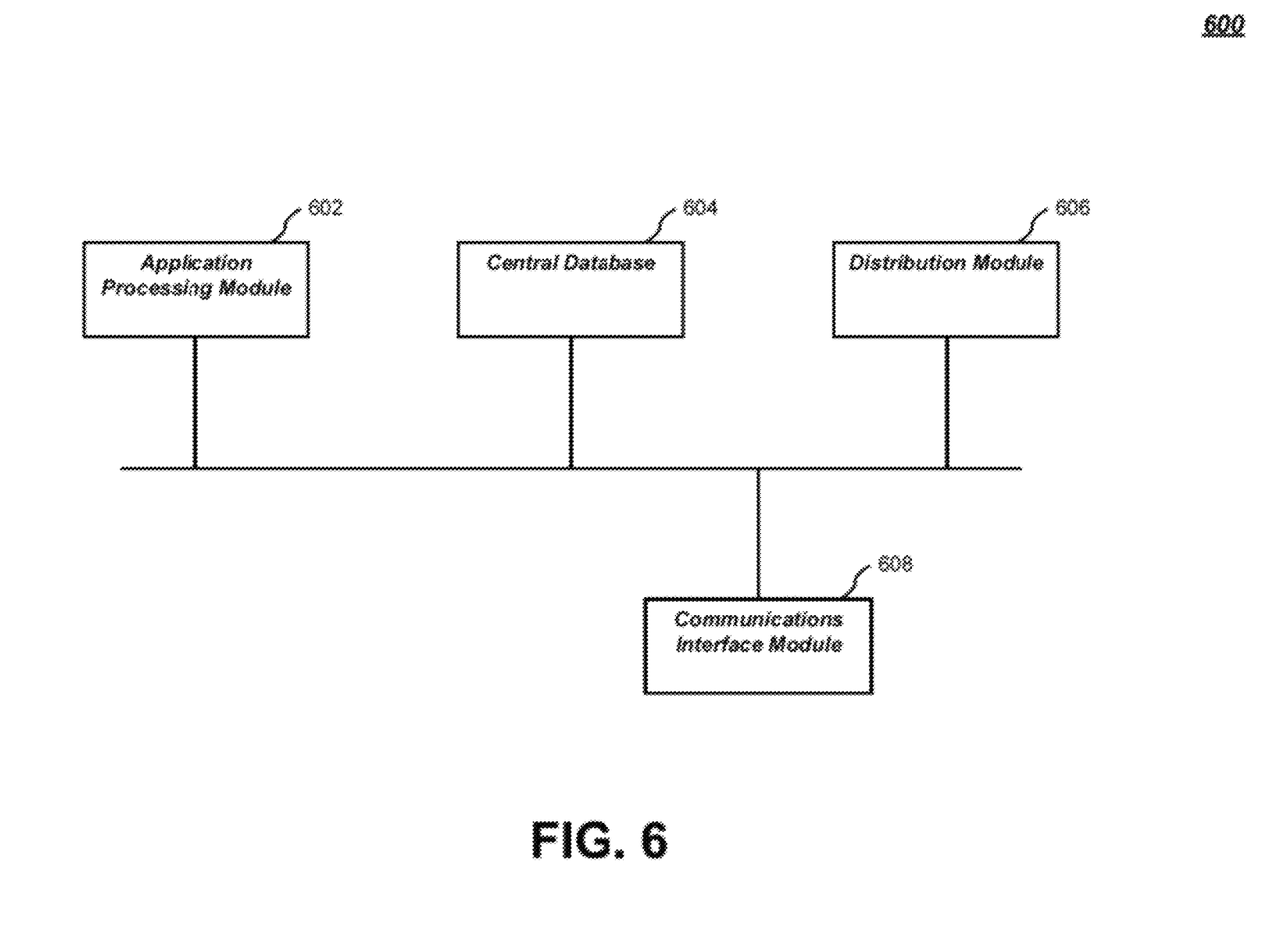
FIG. 6 is a diagram of an exemplary implementation that may be included in a central processing segment.

FIG. 6 is a diagram showing an exemplary implementation 600 that may be included in central processing segment implementation 104. As shown in FIG. 6, implementation 600 may include an application processing module 602, a central database 604, a distribution module 606, and a communications interface module 608. These elements may be implemented in any combination of hardware and/or software.

Application processing module 602 performs operations corresponding to a MAR application. Such operations may involve one or more characters and/or objects. In embodiments, such operations may be in response to information received from one or more user platforms. Further, such operations may generate information that may be employed by one or more user platforms. Such information may be stored locally (e.g., within central database 604). Alternatively, such information may be distributed to the one or more user platforms.

Central database 604 stores information pertaining to a MAR application. For example, central database 604 may store information regarding, objects, characters, and so forth. In embodiments, this information may include information stored in object profile database 212, object profile database 213, and/or object characteristics database 214. Application processing module 602 and/or user platform(s) may access and/or generate such information in the performance of various MAR application-related operations.

Distribution module 606 exchanges information with one or more user platforms. For instance, distribution module may receive information from a particular user platform and forward it to one or more other user platform(s). Additionally or alternatively, distribution module may store such received information in central database 604. Further, in embodiments, distribution module 606 may access information from central database 604 and provide such information to one or more user platforms.

Communications interface module 608 provides for the exchange of information across one or more networks (e.g., such as across communications infrastructure 106 of FIG. 1). Accordingly, communications interface module 608 may include control logic to operate in accordance with one or more communications protocols. Moreover, communications interface module 608 may include various elements, including (but not limited to) transceiver(s), modulators, demodulators, upconverters, downconverters, mixers, buffers, filters, and/or amplifiers.

Figure 7:
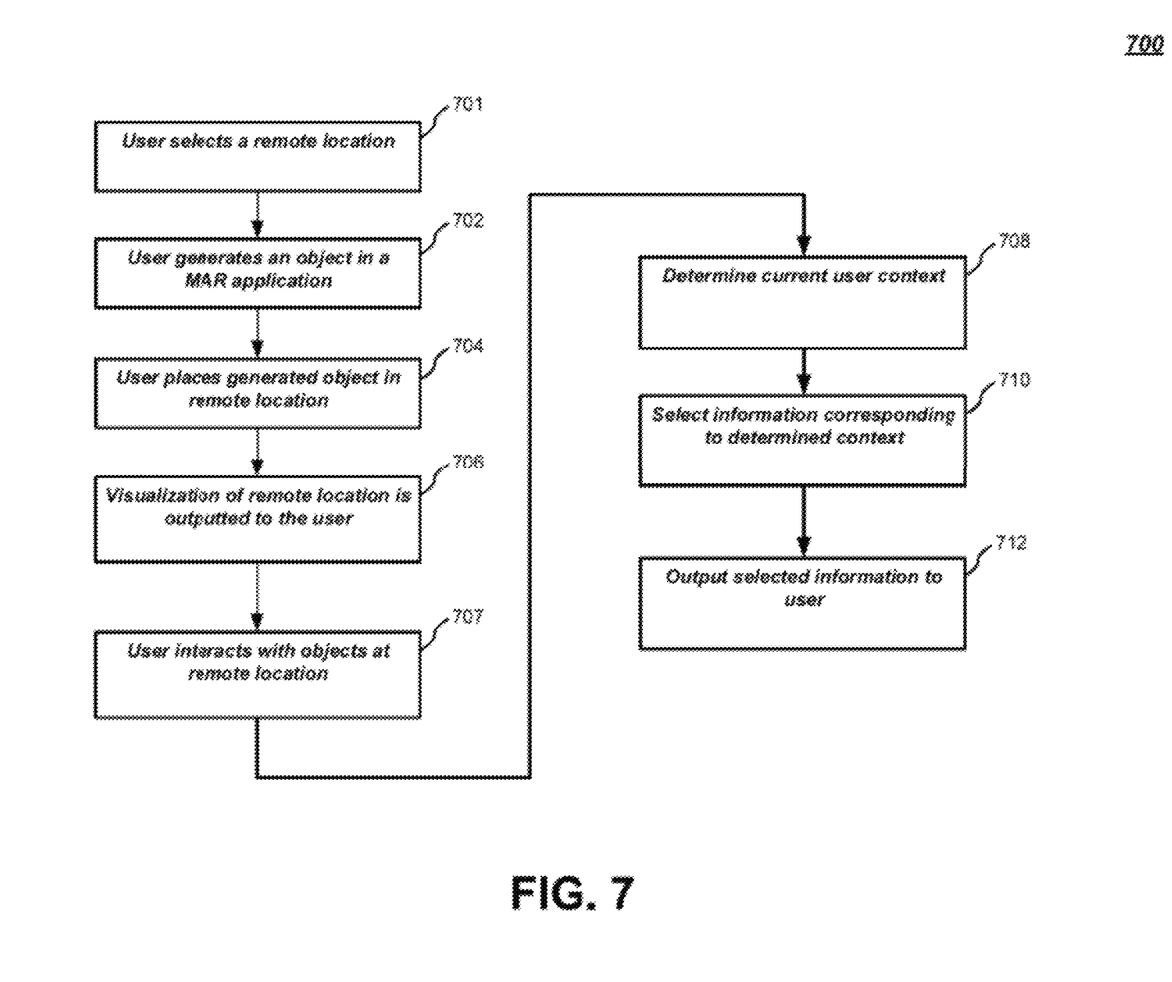
FIG. 7 is a logic flow diagram.

FIG. 7 illustrates an exemplary logic flow 700, which may be representative of operations executed by one or more embodiments described herein. Thus, this flow may be employed in the contexts of FIGS. 1-4. Embodiments, however, are not limited to these contexts. Also, although FIG. 7 shows particular sequences, other sequences may be employed. Moreover, the depicted operations may be performed in various parallel and/or sequential combinations.

At a block 701, a user selects a remote location. This location is different from a current location of the user. For example, this location may be location is outside of an image sensor field of view of the user's platform. In embodiments, this may comprise the user selecting location coordinates. Additionally or alternatively, this may comprise the user navigating through a displayed may (e.g., a locally-stored map or a map provided by a web server).

At a block 702, a user generates an object in a MAR application. This object may be, for example, a character or other object (e.g., a shield). This may involve the user inputting data regarding the object. In turn, this data may be arranged and stored as an object profile (e.g., in object profile database 312 or character profile database 313).

Based on this generation, at a block 704, the user places the generated object in the remote location. For instance, this may involve the user inputting a particular location specifier. In turn, this location may be stored/updated in the object's profile.

At a block 706, a visualization of this remote location is provided (e.g., displayed) to the user. In embodiments, the user may select this visualization. This visualization may provide various perspectives. For example, an aerial or map perspective may be provided.

At a block 707, the user may interact with one or more objects provided in this visualization. Such interactions may involve communications (e.g., text and/or audio communications) across a communications band. Moreover, the user may send objects (e.g., characters, shields, etc.) and/or attacks (e.g. bombs, landmines, missile launches, etc.) directed to the objects in the visualization. Embodiments, however, are not limited to these examples.

As described herein, embodiments provide context-based customization techniques. Thus, at a block 708, a current context is determined. This context may include various attributes, such as a current user activity (e.g., a representation of the user taking an action such as shooting a target or acquiring a weapon), a current user location, and/or a current user device configuration.

Based on this determination, information corresponding to the current context is selected at a block 710. This information may include MAR object data and/or a visualization of the MAR environment. This selected information is then outputted to the user at a block 712.

The operations of FIG. 7 are provided for purposes of illustration, and not limitation. This embodiments may employ further features. For instance, in embodiments, real objects may be placed (e.g., by users) in a real environment. These real devices may have location determination components (e.g., global positioning system receivers) that allow for them to determine their current location. In turn, such objects may include transmitters to transmit (e.g., wirelessly transmit) their locations to one or more MAR application devices (e.g., to one or more of user platforms 102a-n and/or to central processing segment 104 across communications infrastructure 106). These objects may have corresponding profiles (e.g., stored in object characteristics database 314) that establish virtual object characteristics (e.g., location, activation parameter(s), and/or activation event(s)). Thus, such profiles may store associations between real objects and virtual objects.

For example, such a real object may be employed as a virtual landmine. When a user platform has circumstances (e.g., location, time, etc.) that match activation parameters of the object (e.g. proximity in location and/or time of the real object), corresponding MAR activation events (e.g., virtual explosions) may be generated.

In the context of FIG. 3, application processing module 320 may track the location of such objects. When the user's current situation matches such activation parameter(s), application processing module 320 may initiate corresponding activation event(s). Such activation event(s) may result in the generation output directives 333 (e.g., for visual/audio output to the user) and/or the updating of MAR application data (e.g., object/character data).

Figure 8:
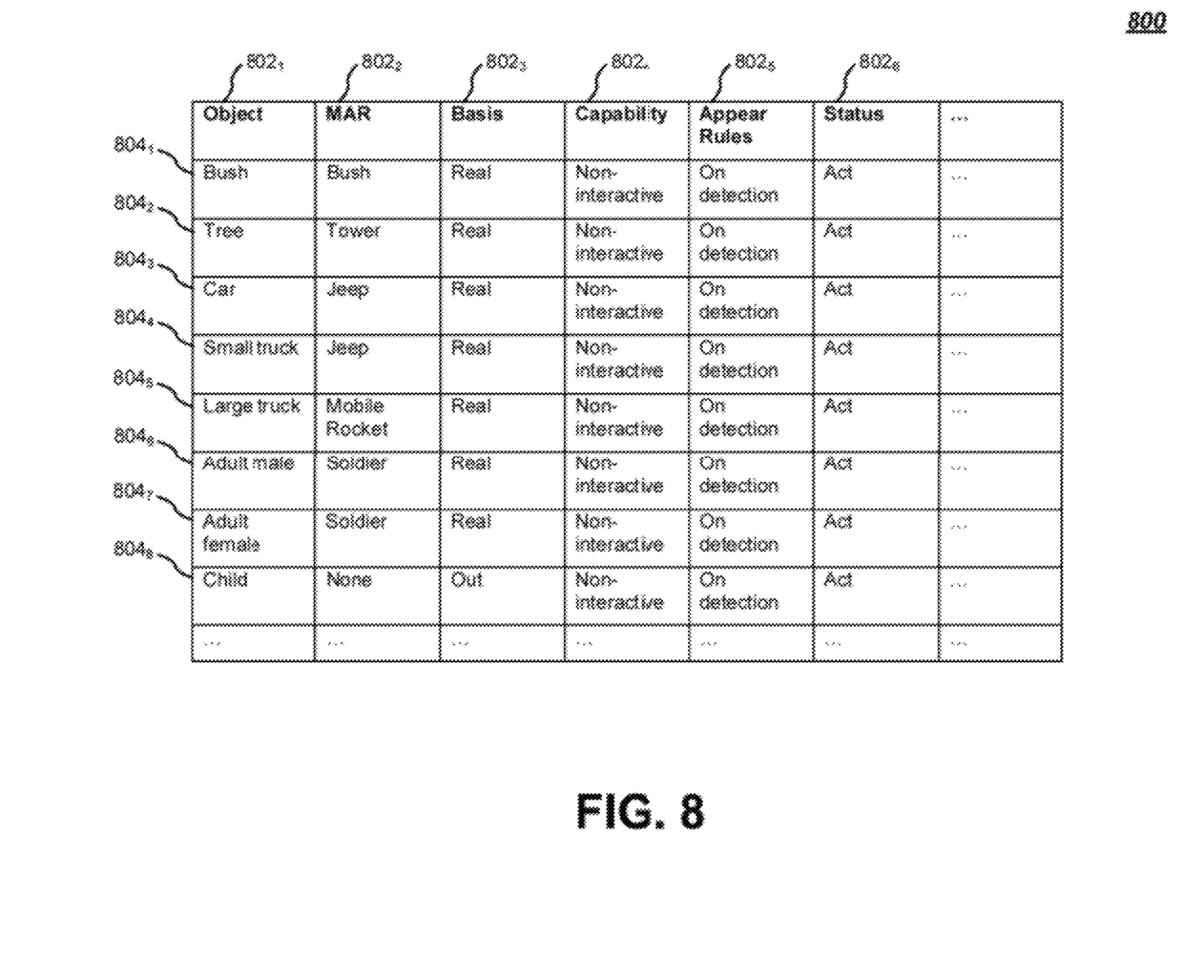
FIG. 8 is a diagram showing an exemplary object profile database implementation.
Figure 9:
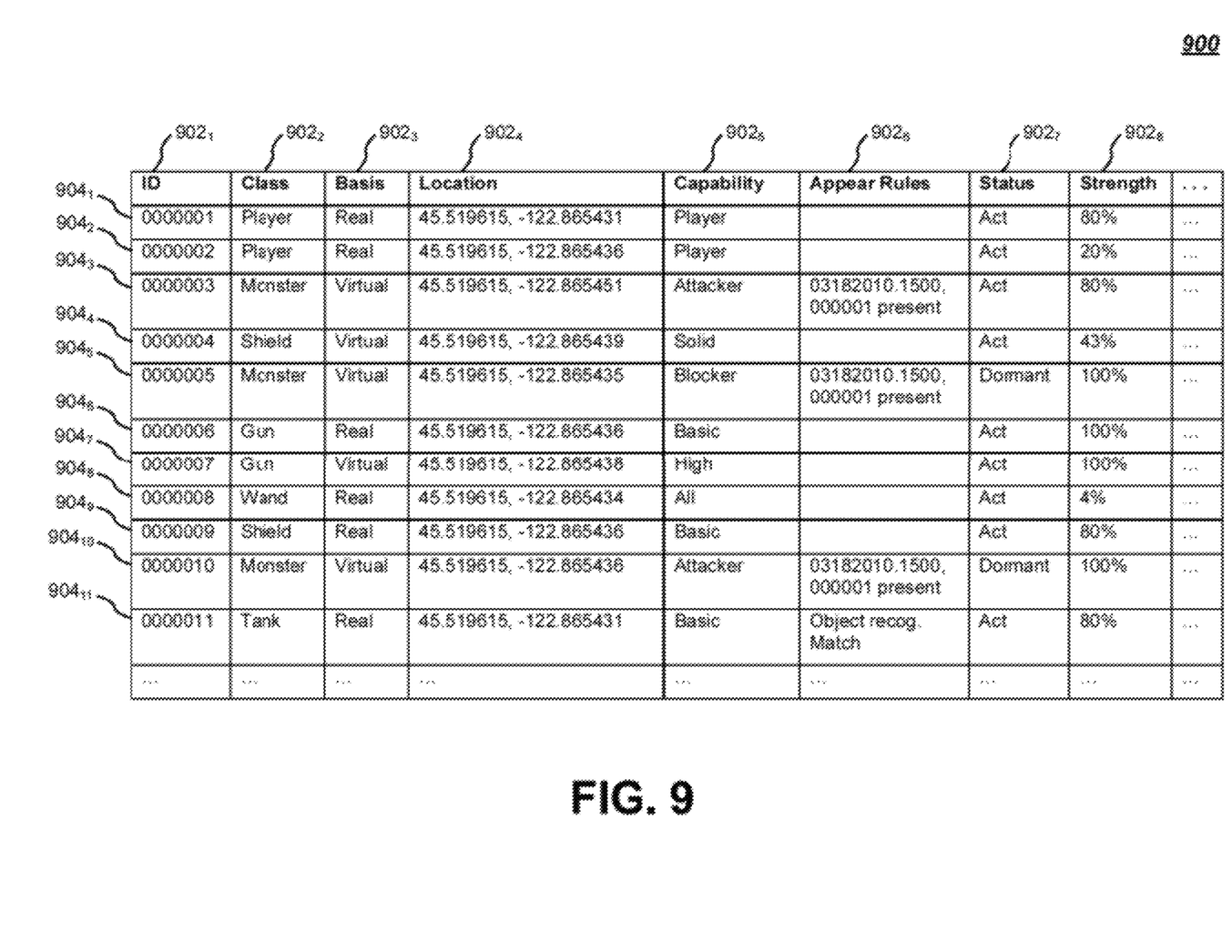
FIG. 9 is a diagram showing an exemplary character profile database.

FIGS. 8 and 9 are diagrams showing arrangements of information that may be managed by embodiments. In the context of FIG. 1, such information may be stored, for example, in one or more of user platforms 102a-n. Alternatively or additionally, such information may be stored in central processing segment 104. However, embodiments are not limited to these examples.

FIG. 8 is a diagram showing an exemplary implementation 800 of object profile database 312. As described above, this database includes information regarding objects that may be identified within an incoming video stream. FIG. 8 shows information being arranged into rows $804_1$-$804_8$. Each of these rows provides an object profile having multiple items of information at columns $802_1$-$802_6$.

For instance, column $802_1$ indicates an object type, which may be identified in an incoming video stream. As examples, FIG. 8 provides the following exemplary object types: bush, tree, car, small truck, large truck, adult male, adult female, and child. These object types are provided for purposes of illustration and not limitation.

Column $802_2$ indicates a MAR object. In a display to a user, this MAR object may replace a detected object of the type indicated in column $802_1$. As described herein, such replacement may involve overlaying the MAR object on the identified object. For instance, row $804_2$ indicates that an image of a tower may replace a tree, when detected.

Column $802_3$ indicates the basis of the object type indicated in column $802_1$. As an example, FIG. 8 shows that a basis of real may be indicated. This denotes that the object is to be detected as a real object in an incoming video stream. Alternatively, a basis of out may be indicated. This denotes that an alteration removing the object from view is to be made.

A capability of the MAR object is indicated by column $802_4$. For example. FIG. 8 shows the capability being non-interactive, which indicates that a character in the MAR application can not interact with the object.

Column $802_5$ provides appearance rules. Such rules indicate when the MAR object (of column $802_2$) is to be overlaid. As an example, FIG. 8 indicates the appearance rule of "on detection", which indicates that the MAR object is overlaid when a corresponding object of the type indicated by column $802_1$ is identified.

Column $802_6$ indicates a status of the profile. In particular, column $802_6$ may indicate whether the profile is active ("act") or dormant. When the profile is active, operations corresponding to the profile (e.g., object replacement) may be performed. However, when the profile is dormant, such operations are to be bypassed.

FIG. 9 is a diagram showing an exemplary implementation of character profile database 313. As described above, this database includes information regarding characters that may be generated by a MAR application.

FIG. 9 shows information being arranged into rows $904_1$-$904_{11}$. Each of these rows provides a character profile. Further, as shown in FIG. 9, each of these profiles includes multiple items of information at columns $902_1$-$902_8$.

For instance, column $902_1$ indicates a character identifier (ID). As shown in FIG. 9, this identifier may be numeric. Column $902_2$ indicates a character class. Exemplary character classes include player, monster, shield, gun, wand, and tank. Embodiments, however, are not limited to these examples.

Column $902_3$ provides a basis (such as real or virtual) for the character. A real basis indicates that there is a corresponding real object (such as an actual person) corresponding to the character. In contrast, a virtual basis indicates that there is not a real object corresponding to the character.

Column $902_4$ indicates a current location of the character. In embodiments, the location may be represented as latitude and longitude coordinates. However, other suitable location representations may be employed. Column $902_5$ indicates the character's capability or role. As examples, FIG. 9 shows the following values for this column: player, attacker, solid, blocker, basic, high, and all.

Column $902_6$ indicates appearance rules for the character. As described herein, such appearance rules may indicate when the character may be visible to players. Column $902_7$ indicates a status for the character. As shown in FIG. 9, exemplary status values include active (e.g., currently appearing) and dormant (e.g., not currently appearing).

Column $902_8$ indicates the character's strength. In embodiments, strength may be used to determine the relative efficacy of the character against other characters.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method comprising:
providing an aerial view of at least one real world person, showing a representation of said real world person, in said real world person's actual position in a real world environment;
providing a depiction of said real world person moving in the aerial view;
superimposing a virtual character in said real world environment;
providing a display to said real world person including said aerial view with said virtual character;
enabling a user remote from said real world environment to modify the depiction of said real world environment by adding an object to said real world environment, said virtual character to interact with said added object; and
enabling said remote user to audibly interact with said real world person.

2. The method of claim 1 including:
receiving, on a processor based device, a video depiction including a depiction of a physical object;
modifying, using a hardware processor, the video depiction by adding a visual object to the depiction;
identifying a type of the physical object; and
using the type to determine a visual alteration of the physical object implemented by the hardware processor.

3. The method of claim 2 including:
identifying a depiction of a person in said video depiction;
identifying an activity type for an activity currently engaged in by the identified depicted person; and
using said activity type to modify said video depiction.

4. The method of claim 2 including:
receiving a user selection of a remote location, the remote location different from a current location of the user; and
outputting to the user, a visualization of the remote location;
wherein the visualization includes representations of one or more mobile augmented reality (MAR) objects within the remote location.

5. The method of claim 4, further comprising:
generating, in response to a user selection, an object in a mobile augmented reality (MAR) application; and
placing the generated object in the remote location;
wherein the visualization includes a representation of the generated object.

6. The method of claim 5, wherein the generated object is a character.

7. The method of claim 5, wherein the generated object is a virtual shield to protect one or more MAR application characters from an attack.

8. The method of claim 7, wherein the virtual shield is permanent.

9. The method of claim 7, wherein the virtual shield is damageable.

10. The method of claim 7, wherein the virtual shield is removable by one or more users.

11. The method of claim 4, wherein the visualization includes an aerial view of the remote location.

12. The method of claim 4, wherein the visualization provides a representation of an interaction among the one or more MAR objects within the remote location.

13. The method of claim 4, wherein the remote location is outside of an image sensor field of view of the user.

14. The method of claim 4, further comprising the user interacting with one of the one or more MAR objects within the remote location.

15. The method of claim 4, wherein the one or more MAR objects within the remote location comprise one or more characters; the method further comprising providing a communications band between the user and the one or more characters;
wherein the communications band provides for audio and/or text communications between the one or more characters.

16. The method of claim 4, further comprising:
determining a current context of the user;
based on the current context, selecting information regarding the MAR application; and outputting to the user information regarding the MAR application.

17. The method of claim 16, wherein determining the current context comprises determining a user location, a user activity, and a user device configuration.

18. The method of claim 16, wherein said selecting comprises selecting details of one or more MAR objects.

19. An apparatus comprising:
a processor to provide an aerial view of at least one real world person, showing a representation of said real world person, in said real world person's actual position in a real world environment, to provide a depiction of said real world person moving in the aerial view, to superimpose a virtual character in said real world environment, to provide a display to said real world person including said aerial view with said virtual character, to enable a user remote from said real world environment to modify the depiction of said real world environment by adding an object to said real world environment, said virtual character to interact with said added object, and to enable said remote user to audibly interact with said real world person; and
a storage coupled to said processor.

20. The apparatus of claim 19 said processor to receive, on a processor based device, a video depiction including a depiction of a physical object, modify the video depiction by adding a visual object to the depiction, identify a type of the physical object, and use the type to determine a visual alteration of the physical object implemented.

21. The apparatus of claim 20, said processor to identify a depiction of a person in said video depiction, identify an activity type for an activity currently engaged in by the identified depicted person and use said activity type to modify said video depiction.

22. The apparatus of claim 20 further comprising:
a storage medium to store an association between a real object type and a virtual object, the real object informing the apparatus of its current location; and
an application processing module to generate one or more events in a mobile augmented reality (MAR) application when a circumstance of a user of the MAR application matches one or more activation parameters.

23. The apparatus of claim 22, wherein the one or more events in the MAR application comprises one or more visual renderings for display to the user.

24. The apparatus of claim 23, further comprising a display device to output the one or more visual renderings to the user.

25. The apparatus of claim 22, further comprising the real object, wherein the real object includes a global positioning system (GPS) receiver to determine its current location.

26. One or more non-transitory computer readable media storing instructions when executed on a hardware processor, cause the processor to:
provide an aerial view of at least one real world person, showing a representation of said real world person, in said real world person's actual position in a real world environment;
provide a depiction of said real world person moving in the aerial view;
superimposing a virtual character in said real world environment;
provide a display to said real world person including said aerial view with said virtual character;
enable a user remote from said real world environment to modify the depiction of said real world environment by adding an object to said real world environment, said virtual character to interact with said added object; and
enable said remote user to audibly interact with said real world person.

27. The medium of claim 26 having instructions to:
receive, on a processor based device, a video depiction including a depiction of a physical object;
modify, using the hardware processor, the video depiction by adding a visual object to the depiction;
identify a type of the physical object; and
use the type to determine a visual alteration of the physical object implemented by the hardware processor.

28. The medium of claim 27 having instructions to:
identify a depiction of a person in said video depiction;
identify an activity type for an activity currently engaged in by the identified depicted person; and
use said activity type to modify said video depiction.

29. The medium of claim 27 having instructions to cause the machine to:
receive a user selection of a remote location, the remote location different from a current location of the user; and
output to the user, a visualization of the remote location;
wherein the visualization includes representations of one or more mobile augmented reality (MAR) objects within the remote location.

* * * * *